United States Patent [19]

Lightfoot

[11] Patent Number: 4,746,924
[45] Date of Patent: May 24, 1988

[54] APPARATUS AND METHODS FOR LOCATING A TARGET UTILIZING SIGNALS GENERATED FROM A NON-COOPERATIVE SOURCE

[75] Inventor: Fred M. Lightfoot, Vashon, Wash.

[73] Assignee: The Boeing Company, Seattle, Wash.

[21] Appl. No.: 799,912

[22] Filed: Nov. 20, 1985

Related U.S. Application Data

[63] Continuation-in-part of Ser. No. 782,501, Sep. 30, 1985.

[51] Int. Cl.[4] .............................................. G01S 3/02
[52] U.S. Cl. .................................... 342/453; 342/159; 342/424; 455/62
[58] Field of Search ............... 342/453, 487, 424, 192, 342/13, 14, 17, 18, 159; 455/133–135, 62

[56] References Cited

U.S. PATENT DOCUMENTS 3,140,443  7/1964  Wimberly ........................... 342/159
3,475,685 10/1969  Covill .................................... 455/62
3,812,493  5/1974  Afendykiw et al. ................. 342/453
4,549,311 10/1985  McLaughlin ......................... 455/62

Primary Examiner—Theodore M. Blum
Assistant Examiner—David Cain
Attorney, Agent, or Firm—Hughes, Cassidy & Multer

[57] ABSTRACT

The positions of a non-cooperative emitter (illuminator) and reflector (target) relative to a receiver of electromagnetic energy, which neither directly nor indirectly controls the illuminator, is determined utilizing emissions received directly from the illuminator as well as reflected emissions from the target. A range $R_I$ between the receiver and the non-cooperative illuminator is determined by measuring the time difference between receiving the reflected signals at a pair of interferometer antennas located at the wing tips of a receiver aircraft. Calculation of the location of the target is accomplished by utilizing range $R_I$, as well as a time differential $\Delta t$ between the receipt of the reflected signals at the interferometer antennas and the receipt of a corresponding direct signals at a radar antenna located at the aircraft. In the event there is clutter in the reflected signal which hinders the determination of the time differential $\Delta t$, clutter processing is performed utilizing the direct signals as a coherent reference and by cross-correlating the direct and reflected signals. The determination of the bearing of the target and the illuminator relative to the receiver is accomplished by an amplitude comparison of the signals received at multiple ports of a multiple beamed phased array radar antenna. The bearing information together with the range and time differential is processed to provide the necessary commands for generating a visual display of the positions of target and illuminator relative to the receiver.

17 Claims, 13 Drawing Sheets

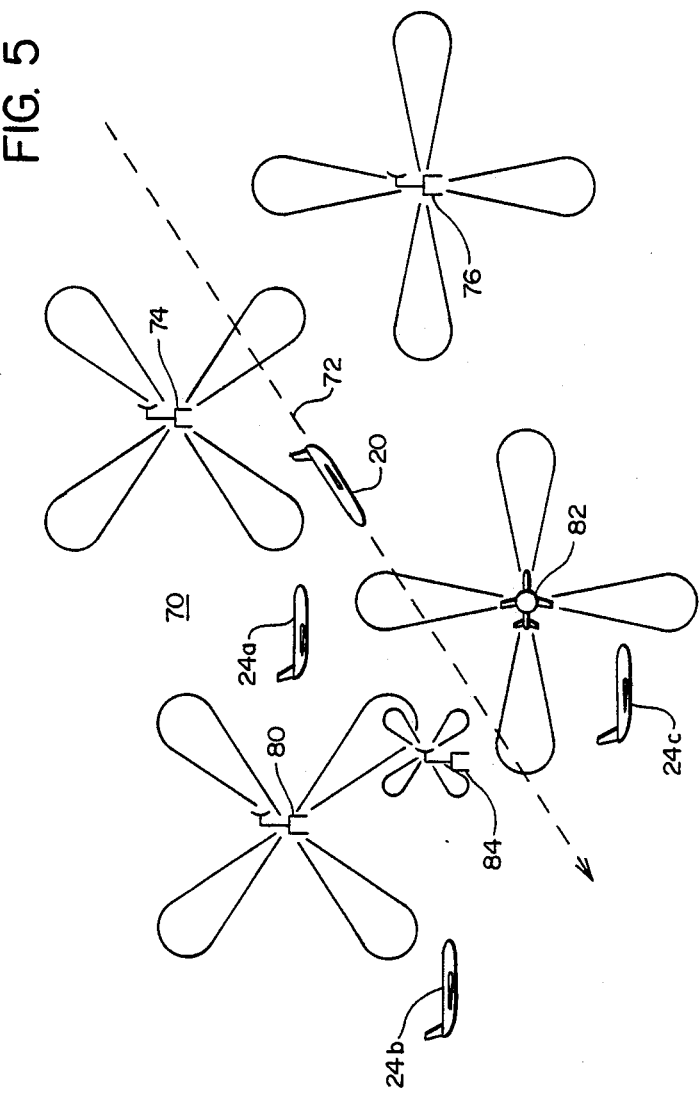

AT t=T, $S_R$ IS IN PHASE WITH $S_D$ PLUS T SECONDS

TO/FROM FIG. 16B

APPARATUS AND METHODS FOR LOCATING A TARGET UTILIZING SIGNALS GENERATED FROM A NON-COOPERATIVE SOURCE

CROSS REFERENCE TO A RELATED APPLICATION

This application is a continuation in part of an application Ser. No. 782,501 entitled "APPARATUS AND METHODS FOR LOCATING A TARGET UTILIZING SIGNALS GENERATED FROM A NON-COOPERATIVE SOURCE" by Fred M. Lightfoot, filed Sept. 30, 1985.

TECHNICAL FIELD

The present invention relates to apparatus and methods for identifying a location of a target object by processing signals generated from a non-cooperative signal transmitter.

BACKGROUND OF THE INVENTION

Bistatic radar principals allow a passive operator to locate a target utilizing both reflected and direct signal emissions generated from a third source. Advantageously, emissions from a non-cooperative radar transmitter are utilized to illuminate a target, and the reflected emissions from the target are processed by a receiver to locate the position of the target. A non-cooperative radar may constitute an enemy radar in a wartime environment, or simply a radar transmitter which is not under the control of the receiver. The procedure of utilizing a non-cooperative radar to illuminate a target has the advantage of locating a target without emitting signals from the searching body thereby avoiding transmissions which can be used to reveal the location of the searcher. This ability to use signals propagated from a non-cooperative third source to avoid detection yet locate target objects has obvious advantages in a hostile environment.

In U.S. Pat. No. 3,812,493—by Afendykiw, et al, a bistatic passive radar was disclosed wherein a pair of interferometer antennas were utilized to measure the time delay in receiving a reflected signal from a target ascompared to receiving a direct signal from a signal source; the time delay was then processed to calculate the distance between the target and the receiver. By cross correlating the phase difference between the same set of signals received at two spaced apart interferometer antennas, the angle of arrival of the signals was determined, which together with the target range was used to locate the position of the target.

Another approach for locating the positions of objects reradiating transmitted energy was disclosed in U.S. Pat. No. 2,971,190—by Busignies, wherein a receiver measured the time difference between receipt of signals directly from a transmitter and signals generated from the transmitter and reradiated from other target objects. A direction finder/receiver utilizing a rotatable directive antenna driven at a predetermined speed generated data indicating the angle of the reradiated signals and the relative timing between the instant when the transmitter was aimed at the receiver and when the transmitter was aimed toward the reradiating object. The resulting values in combination with the time difference between the receipt of direct and reradiated signals was used to locate the position of the target objects with respect to the receiver.

An array of three or more receiving antennas located in a triangular relationship was disclosed in U.S. Pat. No. 4,393,382—by Jones, to determine the range between a transmitter of RF energy and the antenna array, wherein the various measured time intervals for the source transmitter to sweep through angles subtended by the receiving antennas together with the scan rate of the transmission source was utilized to determine the angle of arrival of the transmissions, which were further combined with a measurement of the sweep time differential for a selected pair of the arrayed antennas to generate a range between the transmitter and the receiving antennas.

In U.S. Pat. No. 4,173,760—by Garrison, apparatus and methods were disclosed for identifying the location of a jamming radar target by generating reference pulses of varying frequency which are utilized in determining the phase relationship between the reference pulses and the corresponding frequency components of the jamming signal as received over a direct path between the reference and the target, and over an indirect path from a cooperative auxiliary receiving antenna spaced a known distance from the primary receiving antenna. The phase difference between the direct and indirect received signals were then combined to locate the jamming transmitter.

The location of a source transmitter is determined using an angle measuring interferometer system in U.S. Pat. No. 3,935,574—by Pentheroudakis, wherein the interferometer utilized a longitudinal antenna array having a base line length greater than the signal wavelength to generate accurate phase measurements which are indeterminate as to the number of cycles which occur between the signal's time of arrival at the two antennas. The indeterminate phase measurements were resolved by generating all possible bearings corresponding to the phase measurement and then utilizing a tracking procedure to establish the correct signal source position.

In U.S. Pat. No. 4,370,656—by Frazier, et al, a bistatic passive radar system is utilized for determining the distance between a receiving aircraft and a transmitting aircraft utilizing radar signals generated from the transmitting aircraft directly to the receiving aircraft as well as transmitted signals reflected from a selected ground location between the two aircraft. Utilizing data such as the altitude of the receiving aircraft, the angle with respect to the vertical which the radar signals are received directly from the transmitting aircraft, the angle with respect to the vertical at which the reflected signals from the ground are received, and an apparent range from the transmitter to the receiver, the distance between the aircraft are computed.

In U.S. Pat. No. 3,210,762—by Brabant, a method or determining the range and altitude of an object which radiates or reflects electromagnetic energy from a receiving object is disclosed wherein variables such as the path length difference between the direct path and the reflective path, a grazing angle at which radiation is reflected from the surface, and the altitude of the receiver are utilized to determine the range between the aircraft. Range, bearing an elevation information to a transmitter of electromagnetic radiation is obtained through ratio comparison of signals received at detectors located at opposite wing tips as well as the nose and underside of an aircraft, in a manner that distance information is determined by measuring the intensities of energy received by respective detectors, and whereas bearing information is determined by orienting the heading of the aircraft with respect to the transmitting source or with respect to an object reradiating reflected energy from the transmitting source.

Another method for determining the range between an emitting target aircraft and a detecting receiving aircraft is disclosed in U.S. Pat. No. 3,721,986—by Kramer, wherein the range between a target aircraft and a receiving aircraft is determined by measuring the angle of elevation between the two aircraft, the altitude of the detecting aircraft above the terrain, and the time interval between arrival at the detecting aircraft of electromagnetic wave energy transmitted from the target aircraft directly to the detecting aircraft, and transmitted to a reflecting surface which is then received by the detecting aircraft.

In U.S. Pat. No. 3,789,410—by Smith, et al, wherein the rate of change in phase difference between two signals received by separated pairs of antenna on a receiving aircraft are utilized to determine the range between a target aircraft and the receiving aircraft.

Radiation from a celestial source such as the sun which is reflected from a target and picked up by a scanning search antenna is compared in Wiley, U.S. Pat. No. 3,171,126, with radiation obtained directly from the sun and received by a receiving reference antenna closely mounted to the scanning search antenna, and the time differential therebetween utilized to determine the target range.

An improvement to the apparatus and methods of U.S. Pat. No. 4,339,755 is discussed in an application Ser. No. 537,498 entitled "PASSIVE RANGING METHOD AND APPARATUS USING INTERFEROMETRIC SCANNING" by Fred M. Lightfoot, filed Sept. 30, 1982; and assigned to the Assignee of the present invention.

SUMMARY OF THE INVENTION

The embodiments of the present invention described more fully hereinafter pertain to apparatus and methods for locating a target relative to a receiver utilizing electromagnetic emissions from a non-cooperative illuminator which is not under the direct or indirect control of the receiver. In a preferred embodiment, the invention will be described with reference to locating a target aircraft from a receiver aircraft utilizing emissions from ground and airborne non-cooperative illuminators. The receiver aircraft includes a pair of wing tip synchronized scanning interferometer antennas for receiving non-reflected emissions from the illuminator aircraft to determine the range from the receiver aircraft to the various illuminators. To ensure optimum illuminator signals are available for locating target aircraft during a journey of the receiver aircraft through non-cooperative airspace, a file of those known non-cooperative illuminators is maintained in an onboard computer. The received signals at the interferometer antennas are compared with the stored file to select an illuminator having signal characteristics and a geographical location relative to the receiver which are most advantageous for illuminating target aircraft.

Along with the determination of the range between the receiver and illuminator, other input variables are calculated for locating and displaying the position of the illuminator and target on a display at the receiver aircraft. Position location requires 1) a determination of the time differential $\Delta t$ between the receipt of a non-reflected (direct) pulse from the selected illuminator and receipt of a corresponding pulse reflected from the target aircraft, and 2) a determination of a bearing of the selected illuminator and the target from the receiver. In order to generate bearing information, the direct signals are received by a receiver aircraft lens antenna and split into a number of separate beams which are scanned at separate ports of the lens antenna in a predetermined manner. Those signals at each of the multiple ports which do not correspond to the selected reflected signal are filtered out. The time differential between receipt of the selected direct and selected reflected signals are then measured to generate a value of $\Delta t$. In the event the receiver and illuminator are at or near the same altitude increasing the likelihood of clutter in the reflected signal, the selected direct signal is cross-correlated with the cluttered signals by delaying the direct signal. The resulting cross-correlation output is a composite signal having a maxima which corresponds to a predetermined processing time plus the time differential $\Delta t$.

The bearing of the target is determined by comparing the amplitudes of the reflected signals received at the lens antenna ports. An interpolation between the adjacent ports having the greatest reflected signal amplitudes determines the angle of arrival of the incoming reflected signal, which in turn is used to generate bearing data in a known manner. The bearing of the illuminator is determined in a like manner utilizing either received direct signals or signals from the interferometer pair.

It is therefore an object of the present invention to provide apparatus and methods for locating a target relative to a receiver utilizing emissions from an illumination source which is non-cooperative relative to the receiver.

BRIEF DESCRIPTION OF THE DRAWINGS

These and other objects and advantages of the present invention will become more readily apparent upon reading the following detailed description and upon reference to the attached drawings in which:

FIG. 5 is a pictorial representation of the flight of a receiver aircraft in an environment having various classes of non-cooperative emitters which are utilized for locating target aircraft in accordance with the present invention;

Figure 1:
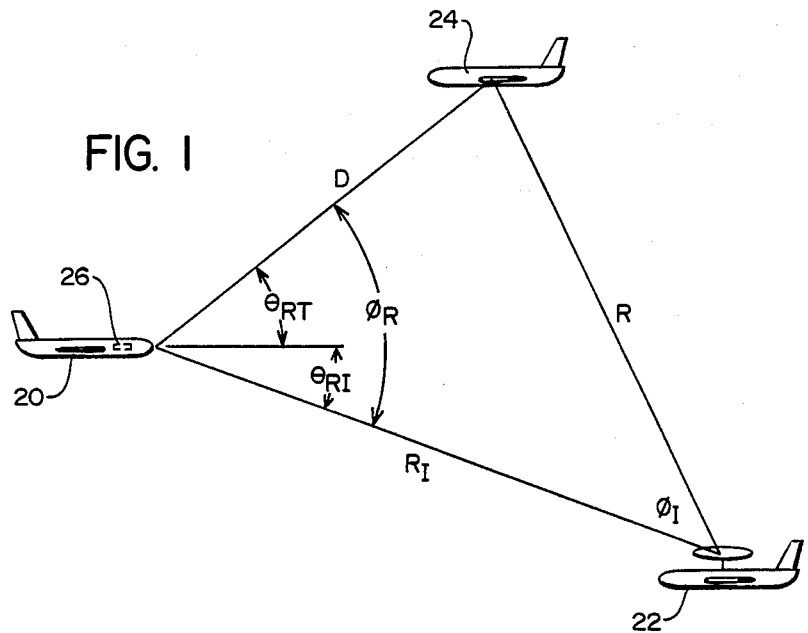
FIG. 1 is a plan view of the target, illuminator and receiver located at co-altitudes and showing the distance and angular relationships necessary for displaying the positions of the target and illuminator relative to the receiver.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION OF THE INVENTION

The present invention comprises apparatus and methods for illuminating targets utilizing the emissions from a non-cooperative emitter of electromagnetic wave energy. In an exemplary embodiment shown in FIG. 1, the present invention will be described with reference to an airborne system for detecting and locating airborne targets in which aircraft 20 enters a hostile or non-cooperative environment to perform a mission in that environment by utilizing emissions from non-cooperating radar 22 to illuminate a target aircraft 24. Those emissions received at aircraft 20 directly from illuminator 22 as well as those reflected illuminating emissions from target aircraft 24 are processed by a detection/location system 26 located onboard aircraft 20 to determine the position of target aircraft 24 without having to emit electromagnetic energy from aircraft 20. Remaining passive in a hostile or non-cooperating environment assists aircraft 20 in escaping detection while revealing the position of other non-cooperating aircraft. It should be appreciated however, that within its broader aspects, the present invention is not limited in its application to the location of target aircraft by a penetrating aircraft, but may be utilized by any receiver of electromagnetic energy to locate other target objects such as other watercraft, land vehicles or geographical locations utilizing emissions from a source which is not under control of the receiver. However, utilization of bistatic radar principles to locate airborne targets creates certain problems due to the large distances and relative speeds between receiver 20, illuminator 22 and target 24, and which problems are overcome by the unique properties of the present invention. Typically the emissions will be from a non-cooperating radar, i.e. radar emissions which are not under the direct or indirect control of the receiver. These non-cooperative emissions may include emissions from hostile radars, as well as emissions from sources bordering the hostile territory which are essentially neutral and are not controlled by either the hostile or penetrating forces.

The determination of the location of target aircraft 24 and illuminator aircraft 22 relative to receiving aircraft 20 is based upon a planar model wherein illuminator 22 and target 24 are assumed to be at the same altitiude as receiver 20. The error introduced by the planar model is relatively minor due to the fact that the horizontal distances between target 24, illuminator 22 and receiver 20 are typically much greater than the vertical altitude separation therebetween.

In addition to mechanically scanned antennas which generally have a predictable scan rate, the non-cooperative illuminator may comprise an electronically steered phased array antenna which is made up of a number of radiating elements. The radiating pattern is generated by varying the relative phases and amplitudes of the currents at the individual elements to steer the direction of the antenna beam. Under the control of a computer, the beam can be steered rapidly between separate locations in space resulting in a scanning direction and scanning rate which is generally unpredictable.

Locating the positions of target 24 and illuminator 22 is accomplished by determining a time differential $\Delta t$ between receipt at receiver 20 of signals generated from illuminator 22 which are received directly therefrom, hereinafter designated as direct signals $S_D$, as well as corresponding signals which have been generated from illuminator 22 and reflected from target 24, hereinafter referred to as reflected signals $S_R$. The resulting time differential $\Delta t$ multiplied by the speed of light provides a value of the length of the signal path from the illuminator 22 via the target 24 to the receiver 20. Coupled with the determination of a range $R_I$ between the illuminator 22 and the receiver 20, an ellipsoid is defined which represents all possible locations of illuminator 22 and target 24 relative to receiver 20. Determination of an angle of arrival to receiver 20 of the direct signal $S_D$ and reflected signal $S_R$ defines the locations of the illuminator 22 and target 24 on the ellipsoid.

Specifically, calculation of the locations of target aircraft 24 and illuminator 22 is accomplished by determining range $R_I$, shown in FIG. 1, between the illuminator 22 and receiver 20 in a manner to be described hereinafter. Utilizing the calculated value of $R_I$, a distance D between receiver 20 and target 24 is determined by the equation:

$$D = \frac{C^2(\Delta t + R_I/C)^2 - R_I^2}{2 * [C * (\Delta t + R_I/C) - R_I \cos \phi_R]}$$

where C=the speed of light, and $\Delta t$ is a measure of the difference in time between reception of illuminator signals $S_D$ directly from illuminator 24 at receiver 20, and reception of illuminator signals $S_R$ at receiver 20 after being reflected from target 22. $\phi_R$ is an angle equal to the difference in a bearing $\theta_{RI}$ of illuminator 22, and a bearing $\theta_{RT}$ of target 24, with respect to receiver 20. In the case of an illuminator 22 which scans at a predictable rate, determination of $\phi_I$ is accomplished by measuring the time interval for illuminator 22 to scan between target 24 and receiver 20 (where $\Delta t$ is much less than the scan time interval), dividing the scan interval time by the time for illuminator 22 to scan through 360°, and then multiplying the resulting quotient by 360°. On the other hand, when illuminator 22 is an electronically scanned phased array beam, $\phi_I$ is measured in a manner to be described further hereinafter.

Utilizing the values of D and $R_I$, the distance R between illuminator 22 and target 24 is calculated by the relationship:

$$R = (R_I^2 + D^2 - 2R_I D \cos \phi_R)^{\frac{1}{2}}.$$

An angle $\phi_I$, representing the difference between the bearings of target 24 and receiver 20 relative to illuminator 22 is calculated by the known equation:

$$\phi_I = \cos^{-1} \frac{(R^2 + R_I^2 - D^2)}{[2RR_I]}$$

Utilizing values of R, $R_I$, D, as well as angles $\phi_R$, $\phi_I$, the positions of illuminator 22 and target 24 may be plotted relative to receiver 20.

Figure 2:
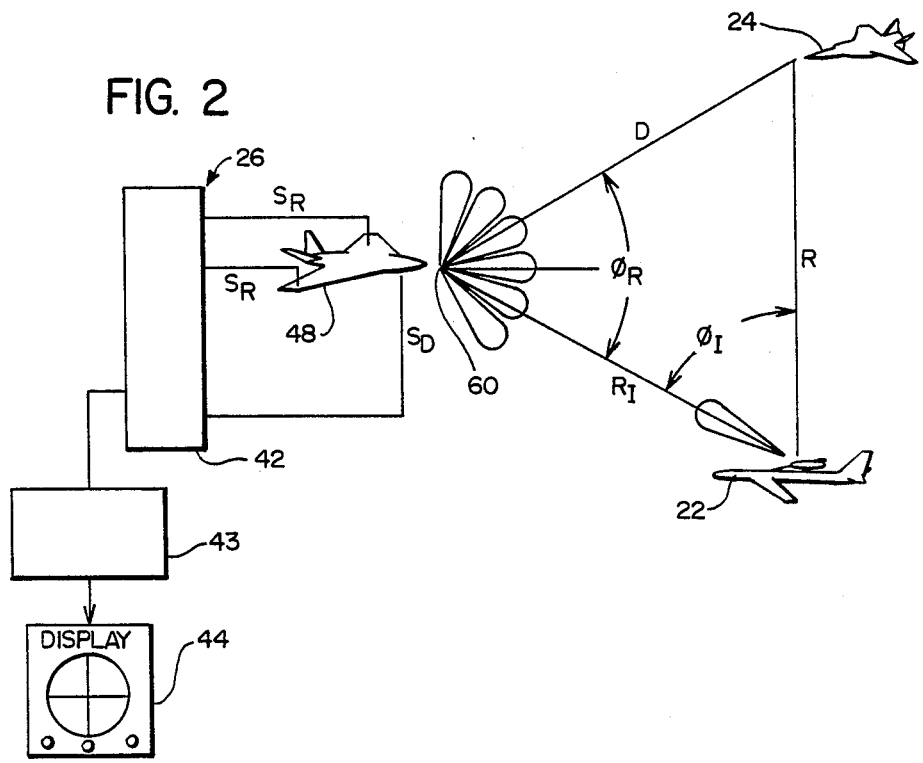
FIG. 2 is a simplified schematical diagram showing the main components of the present invention for locating and displaying the target and illuminator relative to the receiver.
Figure 3:
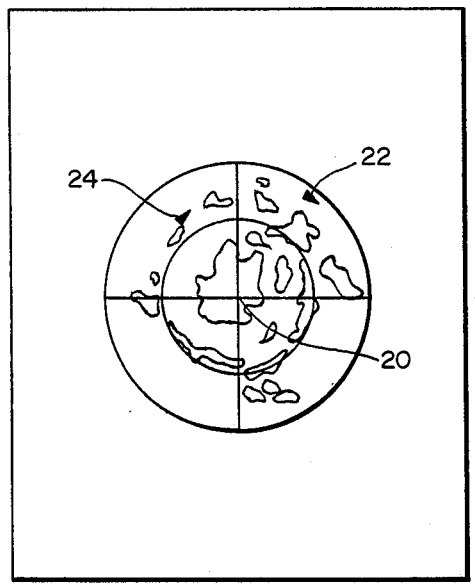
FIG. 3 is a pictorial representation of an exemplary embodiment wherein the positions of the target, illuminator and receiver are displayed on a planned position indicator (PPI)

As shown in FIG. 2, locating system 26 includes a digital computer 42 having permanent and temporary memory. Computer 42 interfaces via a symbol generator 43 with a visual display unit 44 located in the cockpit of receiver aircraft 20. Calculated values of $R_I$, R, D, $\phi_{RI}$ and $\phi_{RT}$ are fed to symbol generator 43 from computer 42 for displaying the position of target 24 and illuminator 22 relative to receiver 20. In an exemplary embodiment shown in FIG. 3, visual display unit 44 is a planned position indicator scope (PPI) which generates a maplike CRT display centered at receiver 20 to display illuminator 22 and target 24 at a calculated range and bearing from receiver 20 in a known manner. The range D is a nonlinear function of the scanning angle of the antenna of illuminator 22 and must be processed accordingly for PPI presentation.

As discussed previously, the location of target 24 is determined utilizing a calculated value of distance $R_I$ between the illuminator 22 and receiver 20. In the present invention quantity $R_I$ is calculated by using methods and apparatus disclosed in either U.S. Pat. No. 4,316,913—by Jones, et al, or U.S. Pat. No. 4,339,755—by Wright, the contents of both of these patents being incorporated herein by reference in their entirety. In Jones, a system for passive ranging on scanning emitters (PROSE) includes two omni-directional receiving antennas which are mounted at the opposite wing tips of an aircraft so that the time difference between receipt of signals from a transmitting source may be measured. Early and late overlapping pulse trains derived from spaced apart receiving antennas are fed to separate first and second channels, and are sampled and held from pulse period to pulse period to form signals representing the amplitude envelopes of the received pulse trains. The output of the first channel is variably delayed and the delayed signal is compared with the undelayed output of the second channel to create an error signal $t'_{21}$. The output of the second channel is sampled and held to create a reference signal that has the proper phase relationship with the error signal $t'_{21}$ so that multiplication of error signal $t'_{21}$ by the reference signal generates a correction signal. The resulting correction signal $t_{21}$ is integrated and fed back to control the time delay applied to the output of the first channel. The integrated correction signal, $t_{21}$, is related to the distance between the illuminator 22 and the receiver 20. This time difference $t_{21}$, together with the measured scan rate of the emitting antenna $w_s$, and an angle of arrival $\theta_{PI}$ of the incoming signal with respect to a reference axis at receiver 20, are utilized to determine range $R_I$ by the equation.

$$R_I = d_S \cos \theta_{PI}/t_{21}w_s$$

where $d_S$=the distance between the receiving antennas.

In Wright, a passive ranging system is disclosed which incorporates a pair of receiving wing mounted directional receiving antennas which are synchronously scanned at a predetermined rate $w_s$ thereby eliminating the need to measure the scan rate as in the PROSE system disclosed in Jones. By scanning the receiving antennas at a predetermined rate, the calculation of range is not dependent upon determination of the scan rate of the source which may not scan in a predictable manner, such as when the transmitting source is an electrically scanned emitter whose beams may be randomly scanned, or when the scanning time of a mechanically scanned antenna is excessively long in relation to the relative airspeeds between the illuminator 22 and receiver 20. Utilizing the above equation, range $R_I$ between receiving aircraft 20 and illuminator 22 is calculated.

Other methods for computing range $R_I$ include passive ranging with interferometer scanning of illuminators incorporating electronically scanned agile beams which are characterized by nonpredictable scan patterns.

Figure 4:
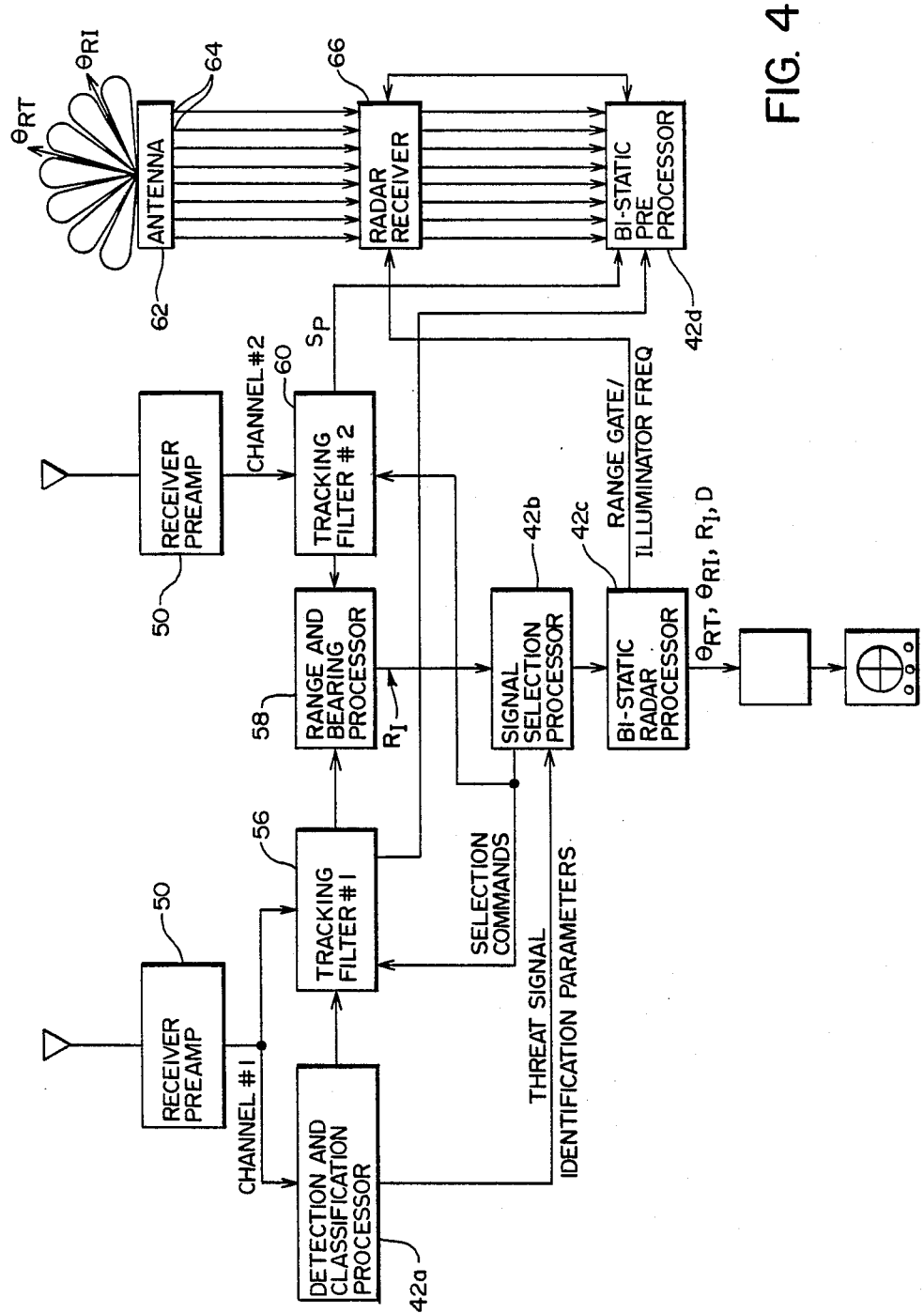
FIG. 4 is a more detailed block diagram of the components of the present invention.

In order to carry out the present invention, computer 42 includes a number of digital processors 42a through d shown in FIG. 4. Direct signals $S_D$ from illuminator 22 are received at interferometer antennas 48 which are mounted at opposite wing tips of receiving aircraft 20. The signals are fed via amplifiers 50 to signal and classification processor 42a. As will be discussed in more detail later, the signals $S_D$ are received from a number of non-cooperative illuminators and processed in a manner to select those signals in accordance with predetermined parameters which will most accurately locate the position of target 24. Once identified, those optimum signals which are known to provide the most favorable illumination characteristics based on preprogrammed criteria such as frequency and pulse width, are separated at filter 56 in accordance with instructions from classification processor 42a, and then fed to signal selection processor 42b.

In addition to selecting those signals having the optimum characteristics for detecting and locating target aircraft 24, improved target location is obtained by utilizing those signals which provide the greatest target resolution as a function of distance and bearing of the illuminator from the target 24. In order to identify those illuminators having the most favorable locations for defining target 24, the selected signals from filter 56 are fed to a range and bearing processor 58 which performs the functions for determining the range $R_I$ to the illuminator 22 as described previously. In the case of an illuminator 22 having a predictable scan rate, the bearing of the illuminator 22 is determined at signal selection processor 42b is a manner also described previously.

In the exemplary embodiment of the present invention, a number of non-cooperative illuminators are examined to provide the most accurate information relative to the location of target 24. It is assumed that receiver 20 is operated in an environment where various classes of electromagnetic radiation are encountered. These emissions may include radiated signals from both ground and airborne emitters such as air surveillance radar, ground control radar for directing non-cooperating aircraft within the non-cooperating airspace, tracking radar utilized to accurately locate the movement of aircraft within the non-cooperating airspace such as for directing guided missile and anti-aircraft fire, and airport approach radar for directing non-cooperating aircraft in and around the non-cooperating airports. The aforementioned emissions typically differ from one another as to their pulse repetition rate, carrier frequency and pulse length. Due to the differing characteristics of these emissions, some provide better illumination of airborne aircraft than others. For example, emissions typically in the 0.5 to 20 GHz frequency range provide the best illuminating signals of airborne aircraft, however most airborne and ground based surveillance radar operation is concentrated within a 0.5 to 4 GHz range.

Referring to FIG. 5, the flight of receiver aircraft 20 into airspace above a non-cooperating land mass 70 is shown along a route of flight 72. Situated on land mass 70 are various illuminators 22 of electromagnetic energy including airport surveillance radar 74, ground based air search radar 76, ground controlled intercept (GCI) radar 80 airborne intercept radar 82 and radio transmission tower 84. Intercept radars 80, 82 provide guidance information to aircrew in non-cooperating aircraft 24a, 24b to direct their movements for the intercept of incoming penetrating aircraft. In accordance with the present invention, aircraft 20 includes, detection and location system 26 (FIG. 4) for processing emissions from the aforementioned radars to provide bearing and distance information of aircraft 24a, 24b relative to receiving aircraft 20.

Figure 6A:
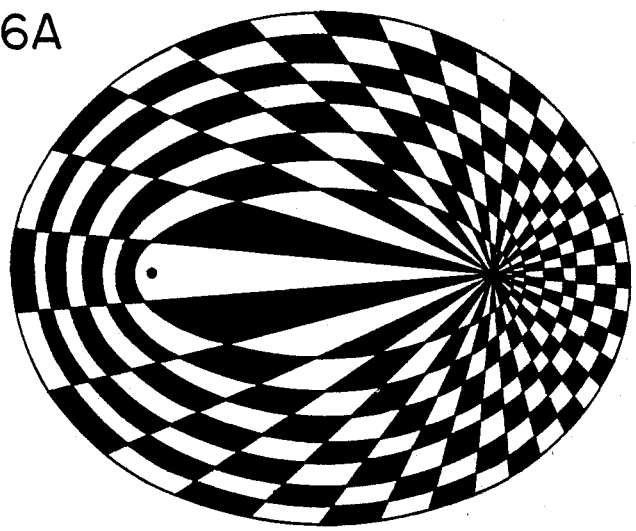
FIG. 6A is a nomograph for determining the relative locations of the target, illuminator and receiver to obtain optimum range and azimuth information for locating the target utilizing emissions from a non-cooperative illuminator.
Figure 6B:
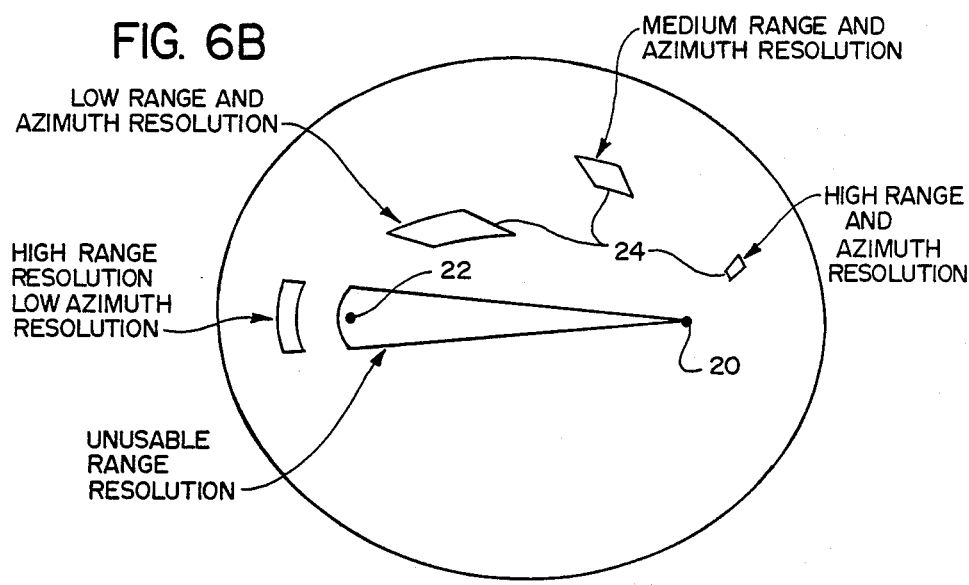
FIG. 6B is a legend for interpretating the nomograph data in FIG. 6A.

Location system 26 selects those non-cooperative emissions which are most advantageous for locating target aircraft 24a, 24b on the basis of both emission signal characteristics and emitter location information relative to receiver 20 and target 24. For example, radio transmission tower 84 can be eliminated as a candidate illuminator because the waveforms of most communications systems do not have the requisite characteristics for providing adequate target range resolution. Furthermore, the location of non-cooperative aircraft 24 of initial concern to receiving aircraft 20 may be in those quadrants located forward of aircraft 20. Therefore emissions from illuminators located near a projected path of aircraft 20, e.g. illuminators 80, 82, are primary candidate illuminators of potential targets. Additional factors regarding the location of candidate illuminators may be discussed with reference to a nomograph in FIGS. 6A and 6B wherein relative resolution of bistatic radar as a function of elipse coverage is displayed, and various positions of target 24 are defined relative to illuminator 22 and receiver 20, as low, medium and high resolution range and azimuth. In FIGS. 6A and 6B, an instantaneous location of receiver 20 at a three o'clock position relative to illuminator 22 is shown. An optimum range and azimuth resolution of reflected signals from target 24 to receiver 20 is obtained when target 24 occupies a location relative to illuminator 22 between a two o'clock and a four o'clock position. On the other hand, when target 24 occupies a position directly between illuminator 22 and receiver 20, the resolution of range of $R_I$ is indeterminate due to the fact that the time differential between a reflected signal path via target 24 and a direct signal path to receiver 20 from illuminator 22 approaches zero. For example, in FIG. 5, the location of illuminator 22 relative to target 24a and receiver 20 provides optimum range and azimuth resolution of target 24a; whereas target 24a occupies a location between illuminator 80 and receiver 20 where the range resolution is unavailable.

Figure 7A:
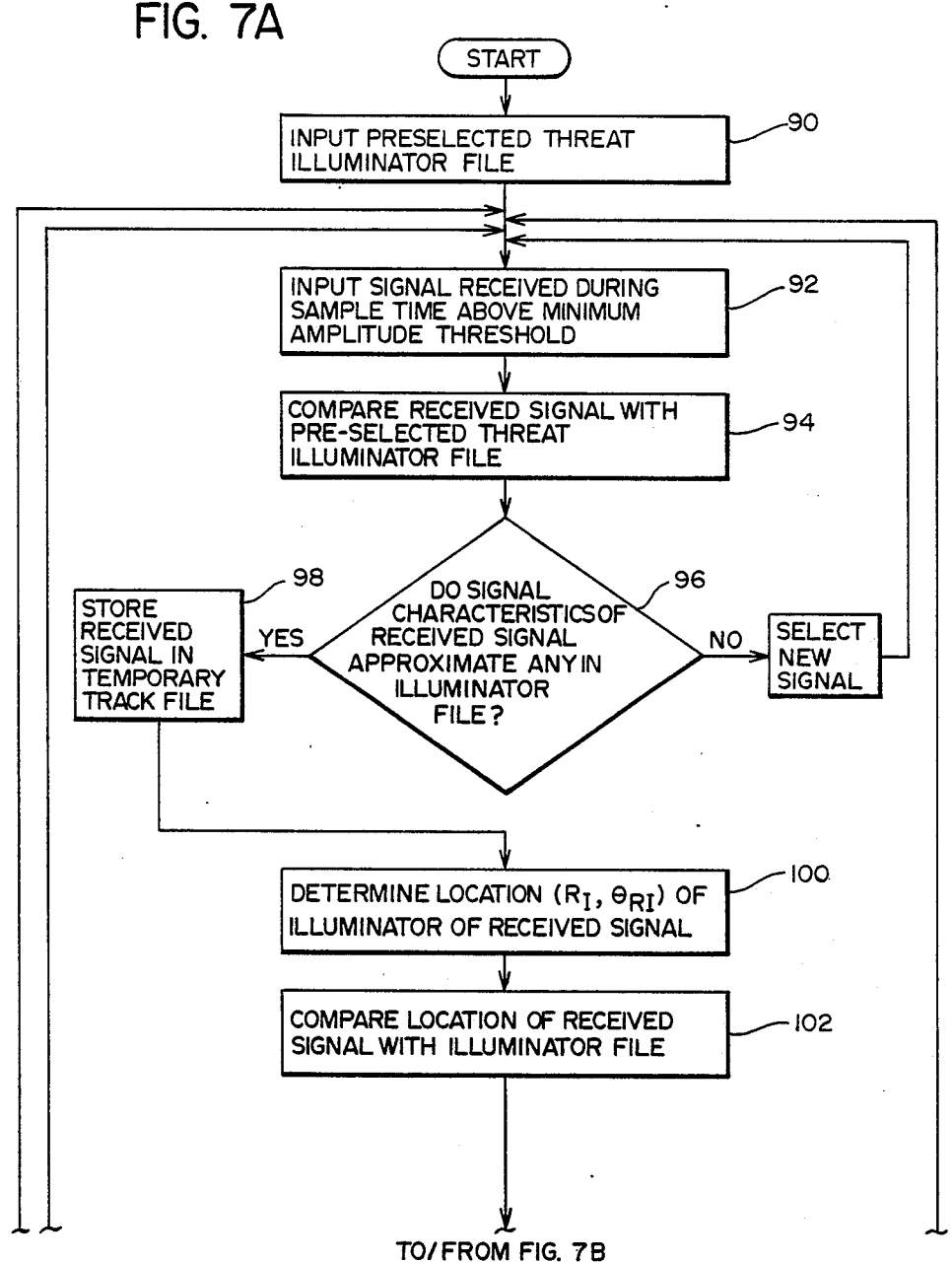
FIGS. 7A and 7B are a flow chart illustrating the procedure for selecting an optimum non-cooperative illuminator from a number of candidate non-cooperative illuminators for locating a target.
Figure 7B:
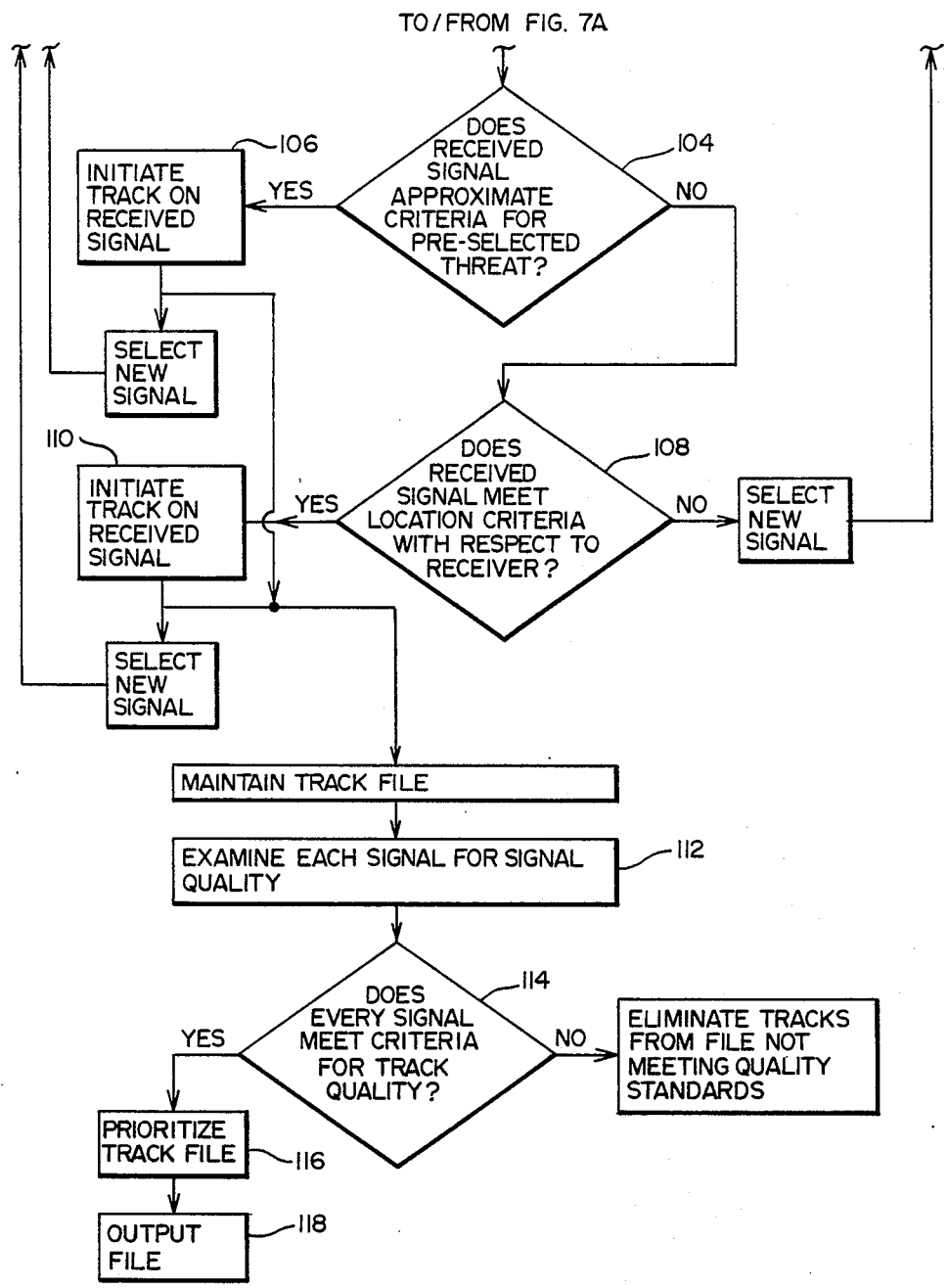

Referring to the flow chart in FIG. 7, the signal characteristics and locations of known non-cooperative emitters are preprogrammed into a threat illumination file at input block 90 of classification processor 42a (FIG. 4) and cataloged according to (1) signal characteristics such as carrier frequency, pulse repetition interval, pulse width, and polarization and (2) geographical location of the illuminator. Incoming direct signals $S_D$ to wing tip antennas 48 are sampled over a predetermined time period and those signals exceeding a minimum amplitude threshold are converted to digital values at block 92 and then compared with the signals in the threat illuminator file at block 94. Any received signals approximating those characteristics stored in the threat illuminator file are retained in a temporary track file and further processed to generate range $R_I$ and angle of arrival information in cooperation with range and bearing processor 58 (FIG. 4). Identification of the illuminator is accomplished by comparing signal characteristics and location data of the received signals with the signals stored in memory at signal selection processor 42b. At decision block 96, if the signal characteristics of a received signal approximate that of a signal in memory, the received signal is stored in a temporary track file at block 98. To further identify the received signal, the location of the illuminator as a function of range $R_I$ and bearing $\theta_{RI}$ is determined at block 100 in a manner discussed previously. After comparing the location of the received signal with the preselected threat file at block 102, a determination is made at decision block 104 whether the received signal matches the signal characteristics and location of any known non-cooperative illuminators which have been preprogrammed into the threat illumination file. When a match is determined, the illuminator is identified and a track file is initiated on that received signal at block 106. On the other hand, if the locational data does not approximate data information stored in the threat illuminator file regarding known illuminator locations, the signal in the temporary track file represents a signal emission from a previously unknown illuminator location. Therefore, the signal is further evaluated at block 108 in regard to location of the illuminator with respect to receiver 20 utilizing criteria discussed previously in order to determine the suitability of the signal for providing optimum target illumination. If the signal meets minimum criteria for illuminating target 24, a track is initiated on the signal at block 110. After all available signals have been examined and the track file has been completed, the signals in the track file are examined at block 112 and a determination is made at decision block 114 whether each of the signals in the track file possess the requisite signal quality, e.g., signal strength, freedom from clutter. Those signals meeting signal quality criteria are prioritized at block 116 on the basis of those signal characteristics, location and signal quality which will provide optimum illumination of a potential target 24. The signal receiving the highest priority is fed to an output file at block 118 for further downstream use as a reference signal $S_P$.

Figure 8:
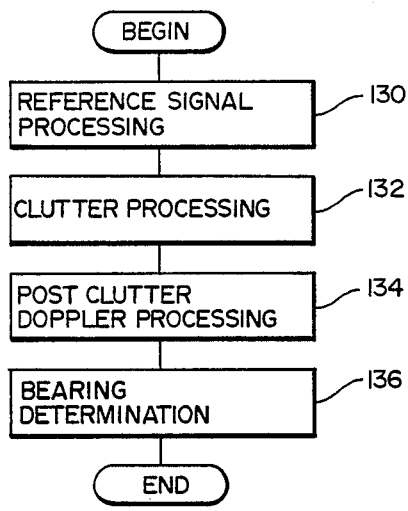
FIG. 8 is a flow chart illustrating a broad overview of the procedure for determining a time differential between receipt of direct and reflected signals generated from the optimum non-cooperative illuminator, as well as for determining the angle of arrival of the incoming direct signals and reflected signals.

In order to calculate $\Delta t$, the time differential between receipt of direct signal $S_D$ and reflected signal $S_R$, certain processing functions are performed, as shown in FIG. 8, which improve the accuracy of the value of $\Delta t$. Incoming reflected signals $S_R$ and incoming direct signals $S_D$ are received at a lens antenna 62 and those signals corresponding to the signal characteristics and illuminator location of reference signal $S_P$ are selected at signal selection processor 42b. Signal processing is performed at block 130 wherein the signal selection commands are fed to tracking filters 56, 60 to remove those refected signals which do not correspond to reference signal $S_P$. The remaining signals $S_R$ are fed to bistatic radar processor 42c, where range gate and illuminator frequency commands are generated in order to slave a conventional radar receiver 66 to the signal selected for processing at signal selector processor 42b.

Figure 9:
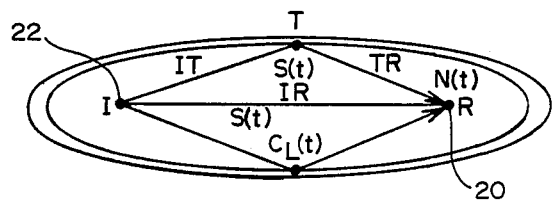
FIG. 9 is a diagram showing the paths of direct signals, reflected signals and clutter signals.

Sometimes the presence of clutter and noise in the incoming reflected signals $S_R$ at receiver 20 effectively hide signal $S_R$ preventing an accurate determination of the time differential $\Delta t$. Clutter results from signals ($C_L$) (FIG. 9) emitted from illuminator 22 and processed at receiver 20 after having been reflected from various ground surfaces. In accordance with the present invention, clutter processing is performed at block 132 utilizing a cross-correlation function to generate time differential $\Delta t$ in a manner to be discussed further hereinafter. The output of the cross-correlation function is a composite signal containing the energy of both the direct signal and the reflected signal and which is more readily detectable amongst noise/clutter. The composite signal is subject to further doppler processing at block 134 on the basis of doppler frequency shifts between the composite signal and the clutter/noise signal. This post clutter doppler processing generates a more precise value of the time differential $\Delta t$ by removing some of the remaining clutter and noise. This post clutter processing may be performed in a conventional manner by band pass filters which are matched to a bistatic radar signal ambiguity function following correlation in a manner known in the art.

In order to determine the bearing of illuminator 22 and target 24, the incoming direct and reflected signals to lens antenna 62 are split into individual beams and fed in parallel from antenna ports 64 to a radar receiver 66. Each of the parallel beam components from antenna port 64 is subject to both clutter processing and post clutter processing procedures. Resulting values of time differential $\Delta t$ determined for each signal beam are averaged together to obtain a best estimate of the time differential $\Delta t$. The bearing of target 24 ($\theta_{RT}$) and illuminator 22 ($\theta_{RI}$) is then determined by calculating the angle of arrival of incoming signals $S_R$ and $S_D$ to lens antenna 62. As discussed previously, electronically scanned illuminators may scan in an unpredictable manner preventing determination of illuminator and target bearing based upon a predictable scan rate. In order to determine the angle of arrival of a non-predictable scanned signal, each of the processed parallel components of the signal from antenna ports 64 are examined to determine the angle of arrival of signals $S_R$ and $S_D$. Therefore, at the same time that direct signals $S_D$ are received at wing tip antennas 48 (FIG. 4), direct signals $S_D$ and reflected signals $S_R$ are received at lens antenna 62 of receiver aircraft 20 where they are fed in parallel to radar receiver 66. Lens antenna 62 is a high gain phased array antenna having multiple receiving elements for receiving both direct and reflected signals. The high gain properties are particularly important when dealing with reflected signals from targets located considerable distances from receiver 20. Simultaneous multiple beam components at ports 64 are generated by a beam forming array such as a Butler beam forming network. The multiple beams are fed to bistatic preprocessor 42d where the relative amplitudes of the incoming parallel beams are compared. Utilizing techniques such as amplitude-comparison monopulse, the bearing $\theta_{RI}$ of the incoming direct signal and the bearing $\theta_{RT}$ of the incoming reflected signal are determined in a manner that an interpolation made between the adjacent ports 64 having the greatest signal amplitude corresponds to the angle of arrival of the incoming signal.

Typically the presence of clutter is minimal when either illuminator 22 or receiver 20 is at a low altitude relative to the other. However, when illuminator 22 and receiver 20 are at or near the same altitude, clutter may be encountered which hinders the determination of the time differential $\Delta t$ between receipt of the direct $S_D$ and reflected $S_R$ at receiver 20. Also present at receiver 20 is random background noise N(t) which further tends to obscure signal $S_R$. The non-predictable transmission wave form is represented in the time domain as the sum of the reflected signal $S_R(t)$ plus the clutter signal $C_L(t)$ plus the noise N(t), and which will hereinafter be referred to as the cluttered signal. Where significant differences in doppler shift occur between receiver 20, illuminator 22 and target 24, conventional doppler filtering may be used to separate the reflected signals $S_R$ from the clutter signal $C_L$ and noise N. Sometimes the clutter spectrum may not be effectively filtered by doppler processing, such as for example, when the illuminator is a non-coherent signal source wherein the phases of the signal carrier components are non-predictable. An example of a non-coherent illuminator is a radar transmitter utilizing a high power magnetron. A typical air defense radar using non-coherent processing contains a repetitive component A(t) cos ($w_c t + \phi_1$) where $w_c$=the radar transmitter carrier frequency, A(t)=the radar pulse envelope and $\phi_1$ is the radar carrier initial phase with respect to the beginning of the transmitted radar pulse, and which is a random variable from pulse to pulse. The present invention utilizes the demodulated waveform of the direct signal $S_D$ as a coherent reference which is cross-correlated with the demodulated waveform of the selected reflected signal to generate a value of the time differential $\Delta t$.

Figure 10:
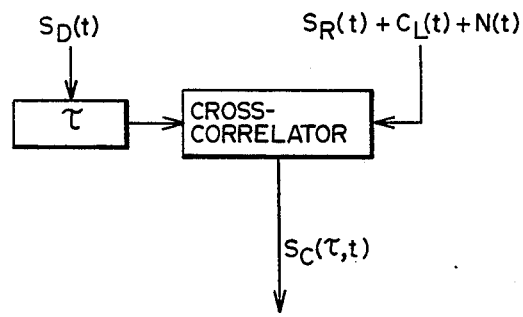
FIG. 10 is a simplified block diagram of a cross-correlation between the direct signal and a reflected signal containing clutter and noise in order to generate a composite signal $S_C(\tau,t)$ utilized to determine a time differential between the receipt of the direct and reflected signals.

In an embodiment of the present invention, the direct signal $S_D$ is cross-correlated, as shown in FIG. 10, with the cluttered signal $S_R(t)+C_L(t)+N(t)$. The cross-correlation operation is performed by varying the time delay of signal $S_D(t)$ until the delay of the signal paths IT+TR (FIG. 9) are equivalent to the signal path IR+$\tau_{max}$, where $\tau_{max}$ is the delay corresponding to the maximum of a composite signal $S_C(\tau,t)$ described by a function, $$S_C(\tau,t) = \int_{-T/2}^{+T/2} \int_{t=0}^{t=T} S_R(t+\tau)[S(t) + C_L(t) + N(t)]d\tau dt$$

In the aforementioned function $\tau$ is the selected delay interval, $\Delta t$ is the selected time interval along a time domain of signals $S_R(t)$ and $S_D(t)$, and T is the integration time to process a selected number of pulses. The selected integration time is dictated both by a need for a statistically sufficient sample size and by the limited amount of time in which target 24 is scanned by illuminator 22.

Figure 11:
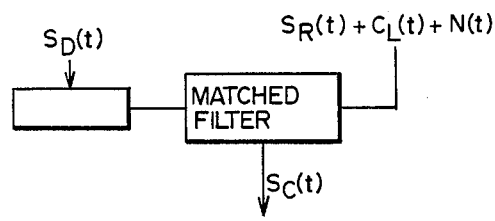
FIG. 11 is a simplified block diagram of a convolutional process utilizing matched filtering between the direct signal and the signal containing clutter/noise in order to generate composite signal $S_C(t)$ for determining the time differential.
Figure 12:
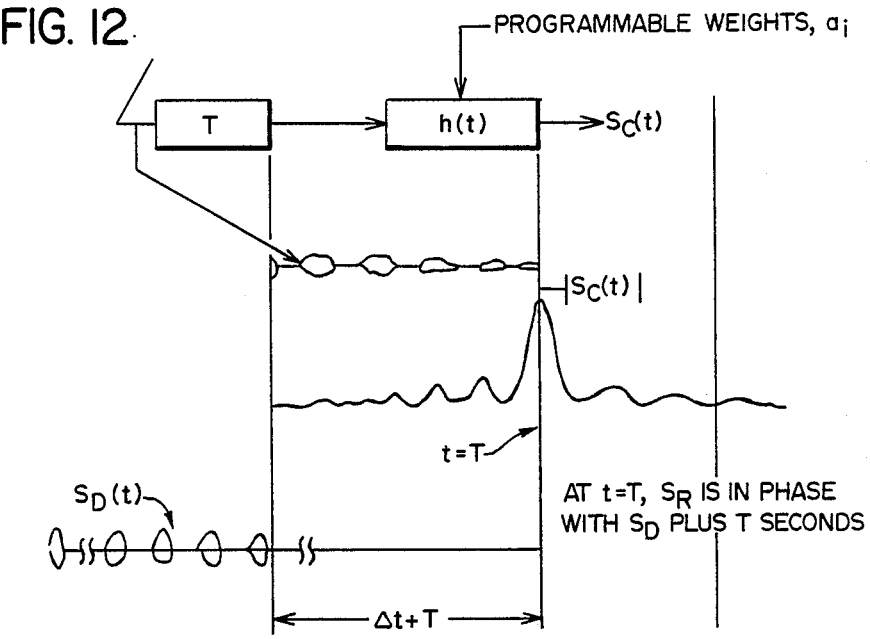
FIG. 12 is a diagram of the convolution process, and composite signal ($S_C$) output therefrom.
Figure 13:
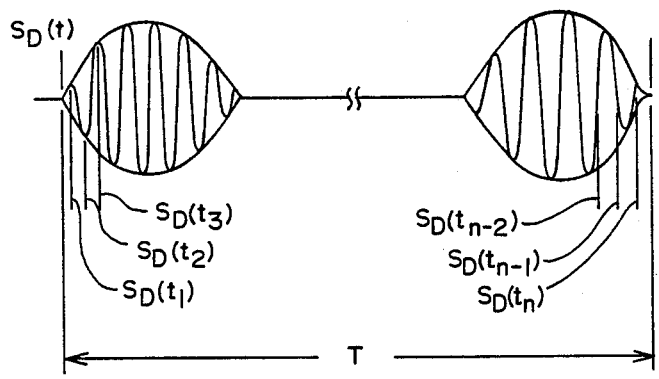
FIG. 13 is a diagram of the waveforms of direct signal $S_D$ used as a reference in the convolutional process and showing waveforms which have identical periods but which have different, initial starting points (non-coherent)

In another embodiment of the present invention, a similar technique using a programmable matched filter, i.e. convolutional signal processing method, may also be employed as in shown FIG. 11 to generate an output equivalent to a cross-correlation of the direct and reflected signals in order to determine time differential $\Delta t$. Referring to FIGS. 12 and 13, the cluttered input signals $(S_R+C_L+N)$ are delayed by a preselected delay period T, while the reference signal $S_D$ is stored and sampled at every $t_i=\frac{1}{2}W$ time intervals where W the band width of signal $S_D$. These samples are normalized so that the largest amplitude of the selection samples is $\pm 1$. These values are used to weight the coefficients of the programmable matched filter in reverse time order. In other words, samples $S_D(t_1)$, $S_D(t_2)$ . . . , $S_D(t_n)$ become coefficients of the filter at taps $a_n$, $a_{n-1}$ . . . $a_1$, respectively of a tapped delay line. The output of the matched filter $S_C(t)$ reaches a maximum at $t=T$, as shown in FIG. 12, and described more fully in *Introduction To Radar Systems* by Merrill I. Skolnik, pgs. 369-376 and which is incorporated herein by reference. This time denotes the time when the cluttered signal is in correlation with $S_D(t)+T$ seconds. The aforementioned convolutional processing method is represented by the equation $$S_C(t) = \sum_{t=0}^{t=T} [S_R(\tau) + C_L(\tau) + n(\tau)]h(t-\tau)$$

where $h(t)=S_D(T-t)$. When output $S_C(t)$ is sampled at $t=T$, $$S_D(T) = \sum_{t=0}^{t=T} [S_R(\tau) + C_L(\tau) + N(\tau)]S_D(\tau) = S_{C\max}.$$

Figure 14A:
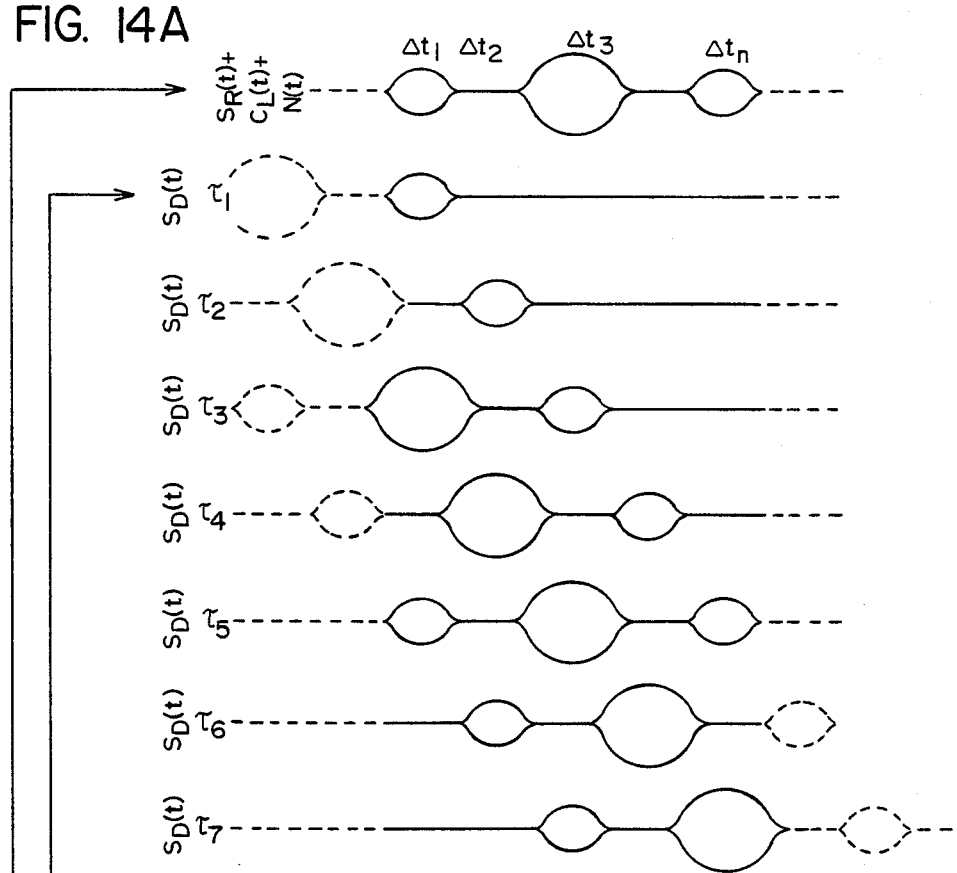
FIG. 14A is a highly idealized version of the cluttered reflected signal and the direct signal as a function of time at various predetermined time delay intervals of the direct signal.
Figure 14B:
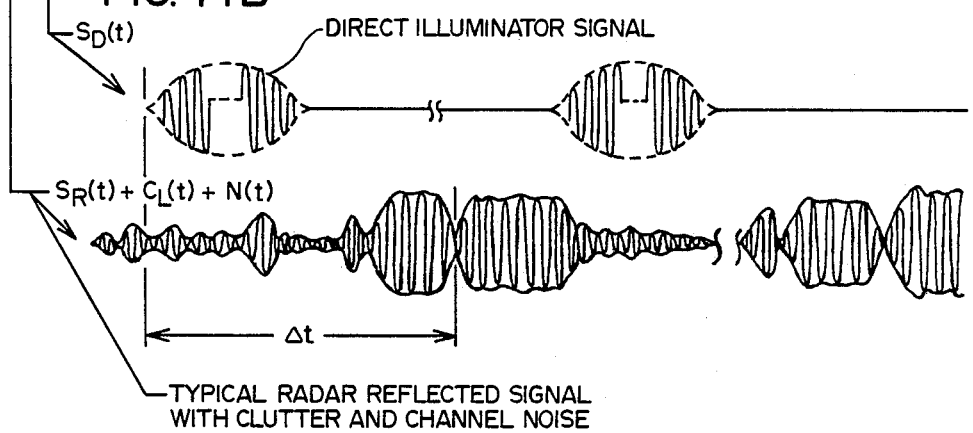
FIG. 14B is a more representative illustration of the cluttered signal and direct signal.
Figure 15:
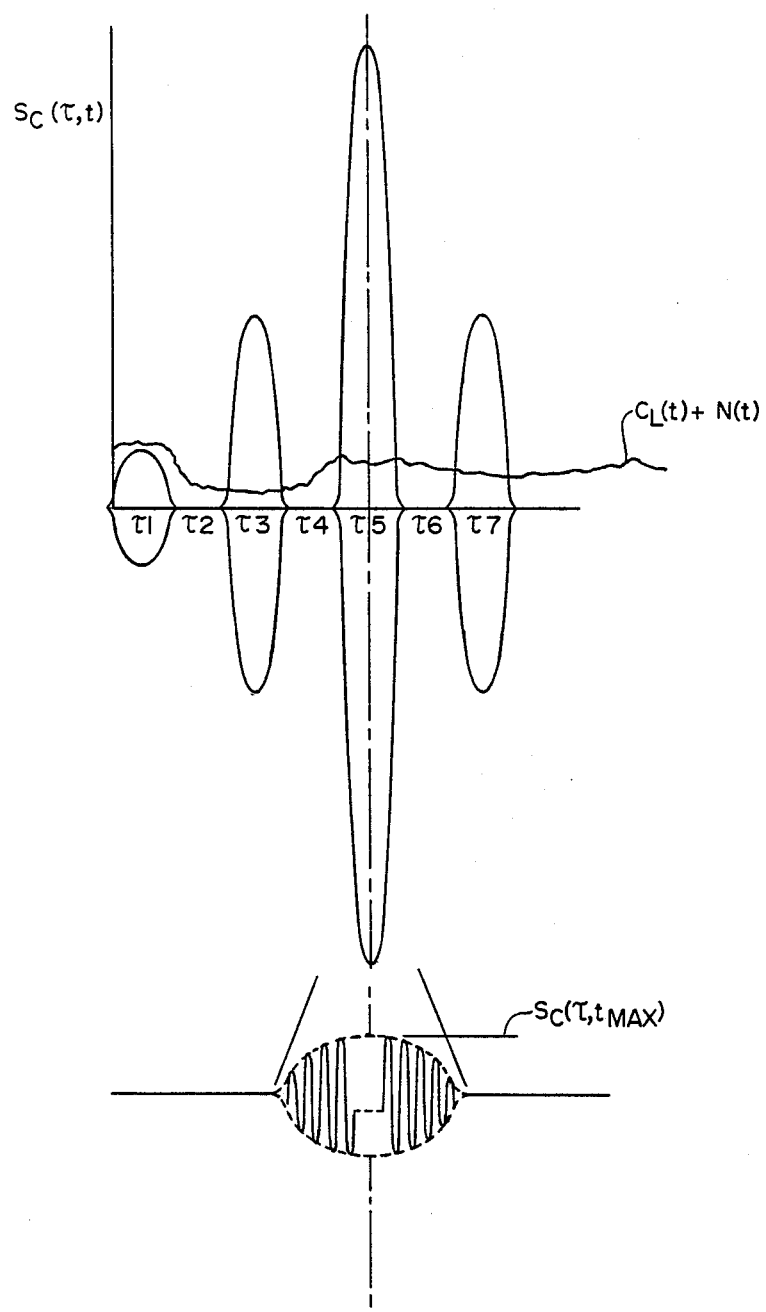
FIG. 15 is a graph of idealized composite signals $S_C(\tau,t)$ appearing above clutter $C_L(t)$ and noise $N(t)$, and resulting from the cross-correlation of the direct and cluttered reflected signals at the various time delay intervals.

The clutter processing technique of the present invention utilizing the aforementioned cross-correlation process is discussed in greater detail with reference to FIG. 14A wherein highly idealized direct signals $S_D$ and the cluttered signals are shown for ease of illustration and which are displayed as a function of time increments $t_1$, $t_2$ . . . through $t_n$; and in FIG. 14B where a more representative depiction of the direct and cluttered signal is shown. The time delayed phase of direct signal $S_D$ relative to the cluttered signal is shown for delay increments $\tau_1$ through $\tau_7$. A cross-correlation output $S_C(\tau,t)$ in accordance with each selected delay is shown in FIG. 15. Briefly, clutter processing is implemented by multiplying the cluttered signal and the direct signal, and then integrating the resulting product over time T. The delay which generates a maxima, i.e. where $S_D(t)$ and the cluttered signal are in phase, corresponds to that time differential $\Delta t$ between receipt of the direct and reflected signals. In the exemplary example shown in FIGS. 14 and 15, the maxima of $S_C$ is at time delay $\tau_5$. By multiplying the respective direct and cluttered signals and then integrating over time interval T, the resulting composite signal $S_C(\tau,t)$ contains the energy of both signal $S_R$ and signal $S_D$ thereby generating a maximum signal where the signal-to-clutter ratio $S_C(t)/C_L(t)$ is maximized for conditions where channel noise is small with respect to $S_R(t)$ and $C_L(t)$, and where $C_L(t)$ is sufficiently statistically independent from signal $S_R(t)$.

Figure 16A:
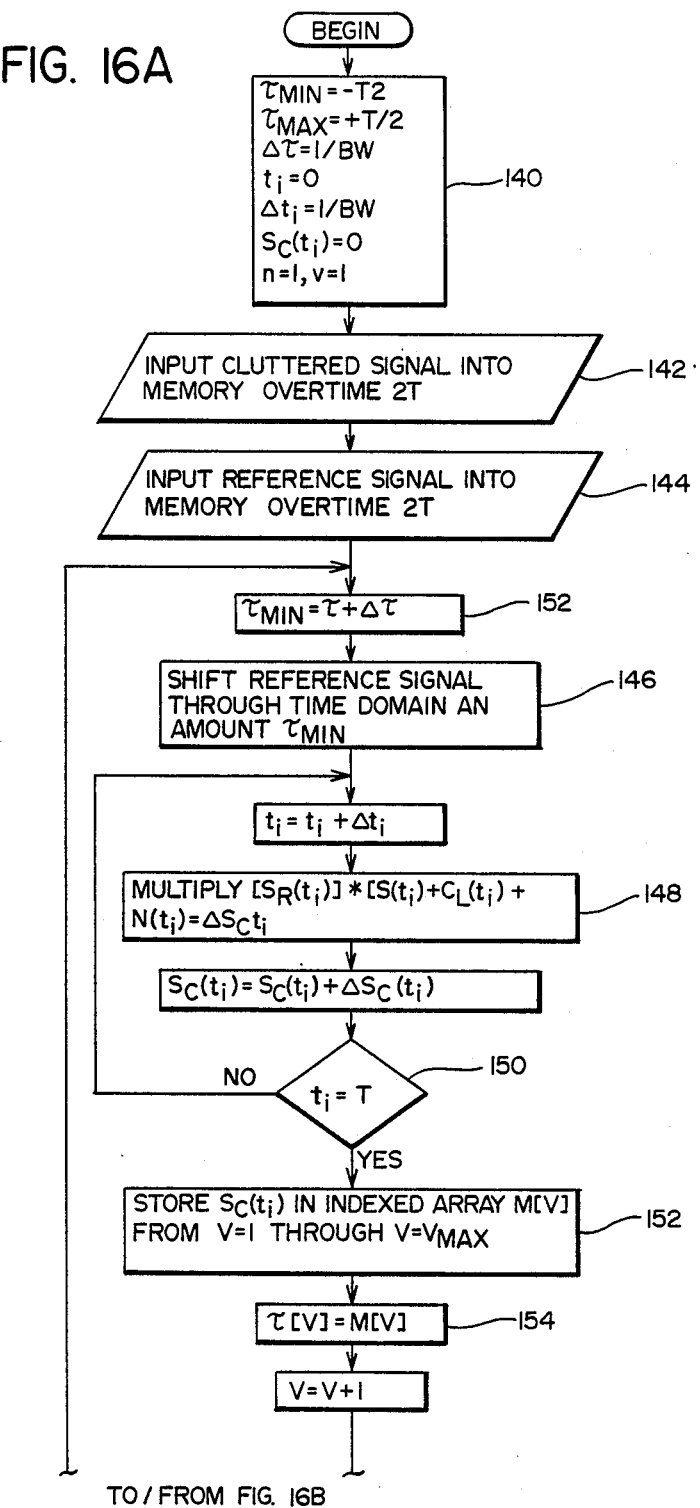
FIGS. 16A and 16B are a flow chart illustrating the clutter processing procedure of the present invention utilizing a cross-correlation technique.
Figure 16B:
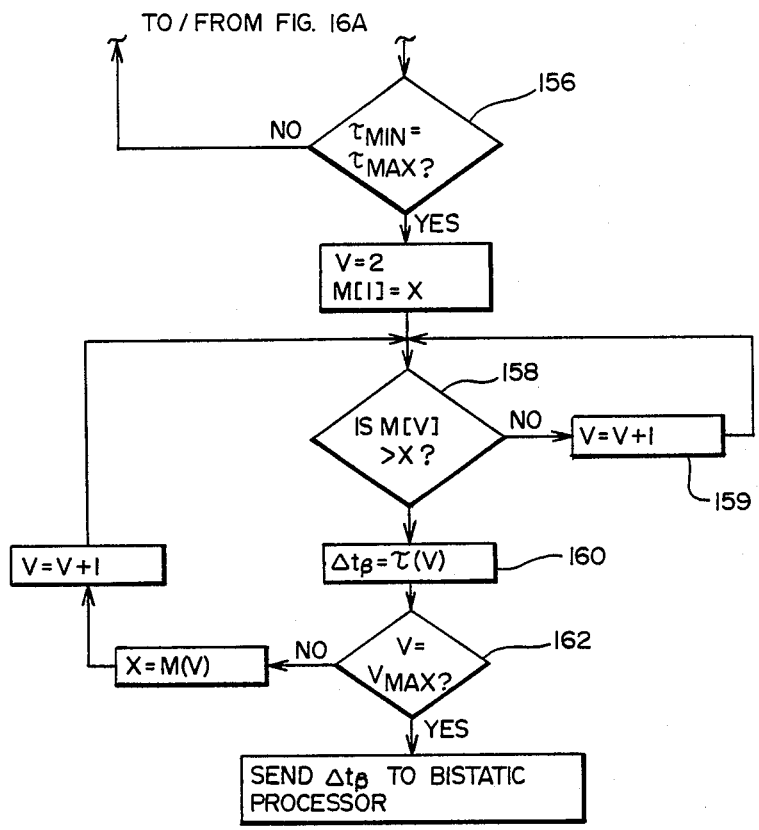

Implementation of the cross-correlation clutter processing technique of the present invention at bistatic processor 42d is shown by the functional steps described in the flow chart of FIG. 16. After initialization of the variables at block 140, the cluttered signal is input into memory over time 2T at block 142, and the reference signal $S_R$ is input into memory over time 2T at block 144. A delay time is selected which is equivalent to the value of 1/BW, where BW is equivalent to the band width of the reflected signal $S_R(t)$. In order to generate composite signal $S_C(\tau,t)$ shown in FIG. 12, the reference signal $S_D(t)$ is shifted in memory a selected $\tau$ at block 146 and multiplied by the reflected signal $S_R$. Signals $S_R$ and $S_D$ may be multiplied in parallel, or serially as described in FIG. 16, wherein selected time increments of $S_D(t)$ and the cluttered signal are multiplied at block 148. In order to generate composite signal $S_C(\tau,t)$ for other time delays $\tau$, at decision block 150 the flow returns to the input at block 146 where a time delay counter 152 is incremented and the reference signal $S_R$ is shifted a corresponding time delay interval.

After generating the composite signals $S_C(\tau,t)$ over the predetermined delay period $\tau_{max}$, the time delay period corresponding to the maximum composite signal $S_C(\tau,t)$ is obtained. Determining a maximum value of $S_C(\tau,t)$ is accomplished by storing each calculated value of $S_C(\tau,t)$ in an indexed array at clock 152, and then storing a value of $\tau$ corresponding to each calculated value of $S_C(\tau,t)$ in a lookup table at block 154. By sequentially incrementing through the indexed array of stored composite signals, a determination is made at decision block 156 whether a succeeding value of the composite signal $S_C(\tau,t)$ stored in the indexed array is greater than the preceding value of the composite signal stored in the array. In the event a succeeding value of $S_C(\tau,t)$ is found not to be greater than the preceeding value at decision block 158, the array index counter is incremented at block 159 which in turn feeds to the input of decision block 158 for subsequent comparisons of the values of $S_C(\tau,t)$ through the indexed array. On the other hand, a succeeding value of $S_C(\tau,t)$ which is found to be greater than a preceding value, causes the corresponding delay $\tau$, to be retrieved from the lookup table to provide an updated value of $\Delta t_B$ at block 160. After the entire array has been searched at decision block 162, the last updated value of $\Delta t_B$, representing the time delay differential between receipt of the direct and reflected signals, is fed to bistatic processor 42c for use in locating the position of target 24.

Further signal processing is performed at bistatic preprocessor 42d to eliminate ambiguous range information in order to further define time differential $\Delta t$.

For example, if the time differential between the receipt of the direct pulse $S_D$ and the reflected pulse $S_R$ exceeds the pulse repetition interval of $S_D$, the range $R_I$ may be ambiguous and therefore require further processing utilizing known procedures such as the Chinese remainder theorum.

On the basis of the aforementioned signal discrimination operations, calculated values of $\Delta t$, $\theta_{RI}$ and $\theta_{RT}$ are fed from radar preprocessor 42d to bistatic processor 42c where the range and bearing of illuminator 22 and target 24 relative to receiver 20 is calculated as discussed previously.

What is claimed is:

1. In a receiver aircraft on a predetermined route of flight, apparatus for locating a position of a reflector of electromagnetic signals relative to a receiver of said electromagnetic signals, said apparatus comprising:
   a. first means for processing a plurality of said received electromagnetic signals which are characterized by their generation from a plurality of signal emitters which are both unassociated from and non-cooperative with said receiver, and for generating a first signal output of said processed signals, said signal emitters including (i) known signal emitters having locations and signal characteristics which are known prior to said flight and which are known to be receivable along said route of flight, and (ii) unknown signal emitters having locations and signal characteristics which are not known prior to said flight and which are also receivable along said route of flight;
   b. second means for selecting one of said received signals having a first component which is reflected from said reflector, and a second nonreflected component, in a manner that said selected signal is an optimum signal for locating the position of said reflector, said second means including
      (1) means for determining the geographical locations of said signal emitters relative to the aircraft,
      (2) computer means including
         (a) memory means for storing, prior to the flight,
            (i) known signal characteristics including signal frequencies, of the known signal emitters,
            (ii) known geographical locations of the known signal emitters, and (iii) selection data for selecting signal characteristics and geographical locations of said unknown signal emitters which are optimum for locating the position of the reflector,
         (b) means, responsive to said first signal output, for comparing the characteristics and locations of the received signals with the signal characteristics and locations of the known signal emitters, so as to identify the known received signals along the route of flight,
         (c) means, responsive to said first signal output, for comparing the characteristics and locations of the unknown signal emitters with the selection data so as to select at least one unknown signal emitter for locating the position of the reflector,
         (d) means for comparing the identified known signals with the selected unknown signal and for selecting the optimum signal therefrom based on their relative signal qualities including signal strength and freedom from clutter;
   c. third processing means including
      (1) means for determining a time interval between receipt of the first reflected signal component and the second nonreflected signal component, and
      (2) means, responsive to the determined time interval, for defining a length of an electromagnetic signal path of the first signal component.

2. The apparatus as set forth in claim 1 wherein said geographical location determining means includes:
   a. means for determining a range between said receiver and said signal emitter; and
   b. means for determining an angle of arrival of said reflected signal component.

3. The apparatus as set forth in claim 2 wherein the length of said electromagnetic signal path is defined as a path extending from said selected signal emitter via said reflector to said receiver.

4. The apparatus as set forth in claim 1 additionally comprising display means for generating a symbolic display of said position of said reflector and said selected signal emitter relative to said position of said receiver.

5. The apparatus as set forth in claim 1 wherein said range determining means includes:
   a. interferometer means for measuring a time delay between receipt of said second non-reflected signal component at spaced apart antenna locations; and
   b. means for calculating said range as a function of said time delay and said angle of arrival of said non-reflected signal component.

6. The apparatus as set forth in claim 1 wherein said third processing means includes signal discrimination means for determining said time interval between receipt of said first component when said first component contains unwanted signals, and receipt of said second component, said signal discrimination means including means for processing said first component and said second component to generate an equivalent cross-correlation output which has a maxima at a time corresponding to said time interval.

7. The apparatus as set forth in claim 6 wherein said equivalent cross-correlation output is obtained by processing said first and second components at matched filter means.

8. The apparatus as set forth in claim 7 wherein said equivalent cross-correlation output is obtained by processing said first and second components at cross-correlation means.

9. The apparatus as set forth in claim 1 wherein said third processing means includes a signal discrimination means for determining said time interval when said first component contains clutter signals, said signal discrimination means including:
   a. means for cross-correlating said first component with said second component at selected delay intervals, and for generating an output indicative of each of said cross-correlations; and
   b. means for detecting a maximum of said cross-correlation outputs and for providing a second output of said selected delay interval which corresponds to said cross-correlation maximum in a manner that said second output is indicative of said time interval between receipt of said first signal component and said second signal component.

10. The apparatus as set forth in claim 9 wherein said received signals include a non-coherent carrier component.

11. The apparatus as set forth in claim 10 wherein said cross-correlation is defined by the equation:

$$S_C(\tau,t) = \int_{-T/2}^{+T/2} \int_{t=0}^{t=T} S_R(t+\tau)[S(t) + C_L(t) + N(t)]d\tau dt$$

where $\tau$ = the selected delay interval between the first signal component $S_R(t)$ and the second signal component $S_D(t)$, $C_L(t)$ = the clutter signal, T = an integration time to process a selected number of signal pulses, and $S_C(\tau,t)$ is the cross-correlation output.

12. In a receiver aircraft on a predetermined route of flight, a method for locating a position of a reflector of electromagnetic signals relative to a receiver of said electromagnetic signals, said method comprising:
 (a) processing a plurality of said received electromagnetic signals which are characterized by their generation from a plurality of signal emitters which are both unassociated from and non-cooperative with said receiver, and generating a first signal output of said processed signals, where said signal emitters include (i) known signal emitters having locations and signal characteristics which are known prior to said flight and which are known to be receivable along said route of flight, and (ii) unknown signal emitters having locations and signal characteristics which are not known prior to said flight and which are also receivable along said route of flight;
 (b) selecting one of said received signals having a first component which is reflected from said reflector, and a second nonreflected component, in a manner that said selected signal is an optimum signal for locating the position of said reflector, said selecting being accommplished by:
  (1) determining geographical locations of said signal emitters relative to the aircarft,
  (2) utilizing computer means by:
   a. storing in memory means of said computer means, prior to the flight, (i) known signal characteristics including signal frequencies, of the known signal emitters, (ii) known geographical locations of the known signal emitters, and (iii) selection data for selecting signal characteristics and geographical locations of said unknown signal emitters which are optimum for locating the position of the reflector,
   b. in response to said first signal output, comparing the characteristics and locations of the received signals with the signal characteristics and locations of the known signal emitters, so as to identify the known received signals along the route of flight,
   c. in response to said first signal output, comparing the characteristics and locations of the unknown signal emitters with the selection data and selecting at least one unknown signal emitter for locating the position of the reflector,
   d. comparing the identified known signals with the selected unknown signal and selecting the optimum signal therefrom based on their relative signal qualities including signal strength and freedom from clutter;
 (c) determining a time interval between receipt of the first reflected signal component and the second nonreflected signal component of said selected signal, and
 (d) in response to the determined time interval, defining a length of an electromagnetic signal path of the first signal component of said selected signal.

13. The method as set forth in claim 12 additionally comprising the steps of:
 (a) determining a range between the receiver and the signal emitter of the selected signal;
 (b) determining an angle of arrival of the first reflected signal component of the selected signal; and
 (c) defining a geographical location of the reflector relative to the receiver in response to the determined time interval, the determined range, and the determined angle of arrival of the first reflected signal component of the selected signal.

14. The method as set forth in claim 13 additionally comprising the steps of:
 (a) identifying the characteristics of the received signals and a location of each of the signal emitters; and
 (b) selecting the optimum signal on the basis of (i) the selected signal having optimum signal characteristics for locating the position of the reflector, and (ii) the emitter of the selected signal occupying an optimum location for generating signals to locate the position of the reflector.

15. The method as set forth in claim 12 additionally comprising the step of determining the time interval between receipt of the first component and receipt of the second component when the first component contains unwanted signals by processing the first component and the second component to generate an equivalent cross-correlation output which has a maxima at a time corresponding to the time interval between receipt of the first component and the second component.

16. The method as set forth in claim 15 additionally comprising the step of determining the time interval by discriminating the cross-correlation output from the unwanted signals by means of a frequency difference between the cross-correlation output and the unwanted signals.

17. The method as set forth in claim 12 additionally comprising the step of determining the time interval between receipt of the first component when the first component contains unwanted signals, and receipt of the second component by:
 (a) cross-correlating the first component with the second component at selected delay intervals, and generating an output indicative of each of the cross-correlations; and
 (b) detecting a maximum of the cross-correlation outputs and providing a second output of the selected delay interval which corresponds to the cross-correlation maximum in a manner that the second output is indicative of the time interval between receipt of the first signal component and the second signal component.

* * * * *